May 11, 1965 R. C. HELDENBRAND 3,182,880
MANIPULATING APPARATUS FOR PRESS FITTING
AND WELDING A SPLIT SLEEVE
AROUND DRILL PIPE
Filed Feb. 5, 1962 4 Sheets-Sheet 1

INVENTOR.
RUSSELL C. HELDENBRAND
BY
ATTORNEYS

May 11, 1965

R. C. HELDENBRAND 3,182,880

MANIPULATING APPARATUS FOR PRESS FITTING
AND WELDING A SPLIT SLEEVE
AROUND DRILL PIPE

Filed Feb. 5, 1962

INVENTOR.
RUSSELL C. HELDENBRAND

BY
*Dunlap, Laney & Hubbard*
ATTORNEYS

May 11, 1965

R. C. HELDENBRAND 3,182,880

MANIPULATING APPARATUS FOR PRESS FITTING
AND WELDING A SPLIT SLEEVE
AROUND DRILL PIPE

Filed Feb. 5, 1962

INVENTOR.
RUSSELL C. HELDENBRAND

BY
Dunlap, Laney & Hubbard
ATTORNEYS

United States Patent Office 3,182,880
Patented May 11, 1965

3,182,880
MANIPULATING APPARATUS FOR PRESS FITTING AND WELDING A SPLIT SLEEVE AROUND DRILL PIPE
Russell C. Heldenbrand, Box 178, New Iberia, La.
Filed Feb. 5, 1962, Ser. No. 170,999
16 Claims. (Cl. 228—6)

This invention relates to earth boring, and more particularly, but not by way of limitation, relates to apparatus for press fitting, welding and heat shrinking a protective sleeve around a joint of drill pipe.

In my copending application entitled "Improved Drill Pipe and Method of Fabrication," Serial No. 164,810, filed January 8, 1962, I have described a novel method for applying a protective sleeve to a joint of drill pipe. The present invention relates to apparatus for performing the method described in the above referenced copending application. The method described therein generally comprises the steps of preheating a pair of semicircular sleeve halves, pressing the sleeve halves tightly against opposite sides of the drill pipe, welding the adjacent edges of the sleeve halves together, and then cooling the sleeve halves whereby the combined force of the expansion of the drill pipe upon release of the sleeve halves and the contraction of the welded sleeve upon cooling securely fastens the sleeves around the joint of drill pipe.

Use of the referenced method is greatly complicated by the size and weight of a joint of drill pipe, by the high temperature of the sleeve halves, by the relatively great force required for pressing the sleeve halves against opposite sides of the pipe and by the fact that most practical automatic welding machines must be positioned above the material being welded. A standard joint of four and one-half inch O.D. drill pipe is thirty feet in length and weighs approximately one-half ton. Therefore some means must be provided for conveniently delivering a number of joints, one at a time, to the work point where the sleeve is to be welded around the pipe joint. The sleeve halves, prior to application to the pipe, are heated to some 600° F. and are therefore difficult to handle. The sleeve halves must be pressed against the sides of the pipe with great force, preferably sufficient force to slightly compress the drill pipe, as described in the referenced application. It is highly desirable to weld the adjacent edges of the sleeve halves together with an automatic welding machine in order to increase the rate of production and to improve the quality of the weld. Since the more conventional and economical welding units presently available are capable of welding only in a horizontally disposed, upwardly facing weld groove, it is necessary to rotate the pipe through at least 180° in order that the diametrically opposed weld grooves formed by the sleeve halves may be welded to form an integral sleeve having two welded seams.

In accordance with the present invention a manipulating apparatus for press fitting and welding a protective sleeve formed from two preheated, semicircular sleeve halves around a joint of drill pipe is provided. The manipulating apparatus is comprised of a support means for supporting a joint of pipe, a pair of dies each having concave wells for holding a sleeve half, the dies being disposed on opposite sides of a joint of pipe resting on the support means, means for moving the dies one toward the other for pressing the sleeve halves against the opposite sides of the joint of pipe with the edges of the sleeve halves in adjacent relationship, and means for welding the adjacent edges of the sleeve halves together to form an integral sleeve around the joint of pipe.

Therefore, it is an important object of the present invention to provide apparatus for press fitting and welding a pair of semicircular sleeve halves around a joint of drill pipe.

Another important object of the present invention is to provide novel apparatus for press fitting the sleeve halves around the pipe.

Still another object of the present invention is to provide novel apparatus for conveying a joint of drill pipe to and from the apparatus for pressing the sleeves around the pipe in a convenient and efficient manner.

Another object of the present invention is to provide a means for rotating the pipe whereby the diametrically opposed seams of the sleeve can be welded.

Still another object of the present invention is to provide apparatus for pressing the sleeve halves against the pipe which is rotatable with the pipe so that pressure can be maintained against the sleeve halves until both diametrically opposed seams have been welded.

Yet another object of the invention is to provide apparatus of the type described which is mounted on a vehicle for transportation to the field.

Another object of the invention is to provide a means for holding the hot sleeve halves in the dies before application to the drill pipe.

Another object of this invention is to provide apparatus of the type described which is particularly adapted for a fixed-base operation in a plant.

Still another object of this invention is to provide a device of the type described which is especially adapted for use in connection with welding heads which are capable of welding in grooves along the sides of horizontally disposed pipe.

Many additional objects and advantages will be evident to those skilled in the art from the following detailed description and drawings, wherein.

Figure 1:
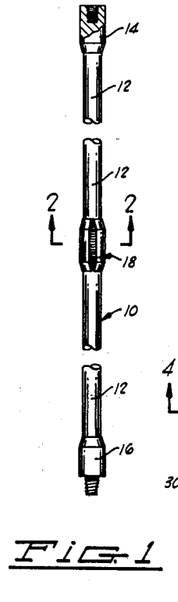
FIG. 1 is a side view, broken for convenience of illustration, showing an improved joint of drill pipe fabricated by the apparatus of the present invention.
Figure 2:
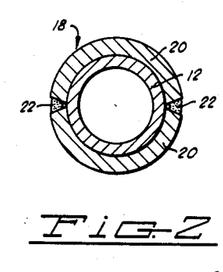
FIG. 2 is a cross sectional view taken substantially on lines 2—2 of FIG. 1.

Referring now to the drawings, and in particular to FIG. 1, an improved joint of drill pipe is indicated generally by the reference numeral 10. The joint of drill pipe 10 has a tubular center portion 12 of constant diameter, an upset female coupling known as a box 14, and an upset male coupling known as the pin 16. An integral protective sleeve 18 is comprised of two semicircular sleeve halves 20 which are integrally interconnected along the adjacent edges by longitudinally extending welded seams 22. The sleeve halves 20 are preheated and press fitted around the tubular center portion 12 prior to welding of the seams 22, as will hereafter be described in connection with the operation of the various embodiments of this invention.

Figure 3:
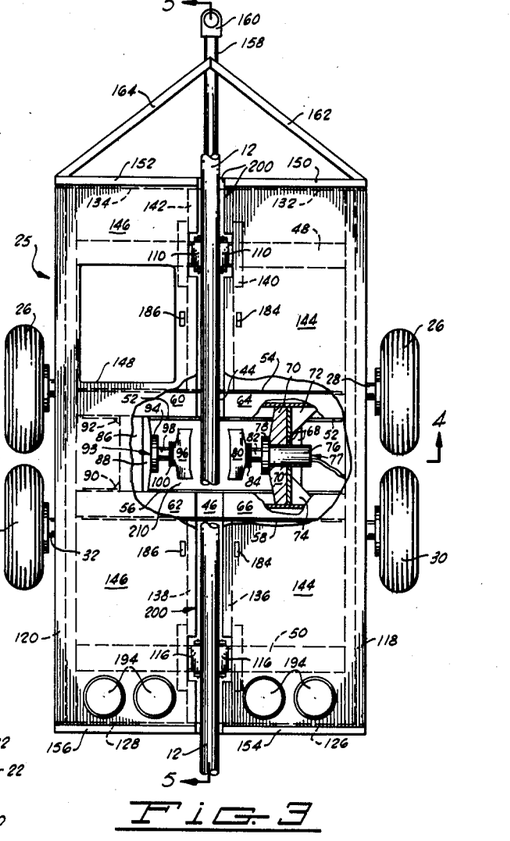
FIG. 3 is a plan view of an apparatus constructed in accordance with the present invention mounted on a trailer for field use.
Figures 4, 5, 6, 7:
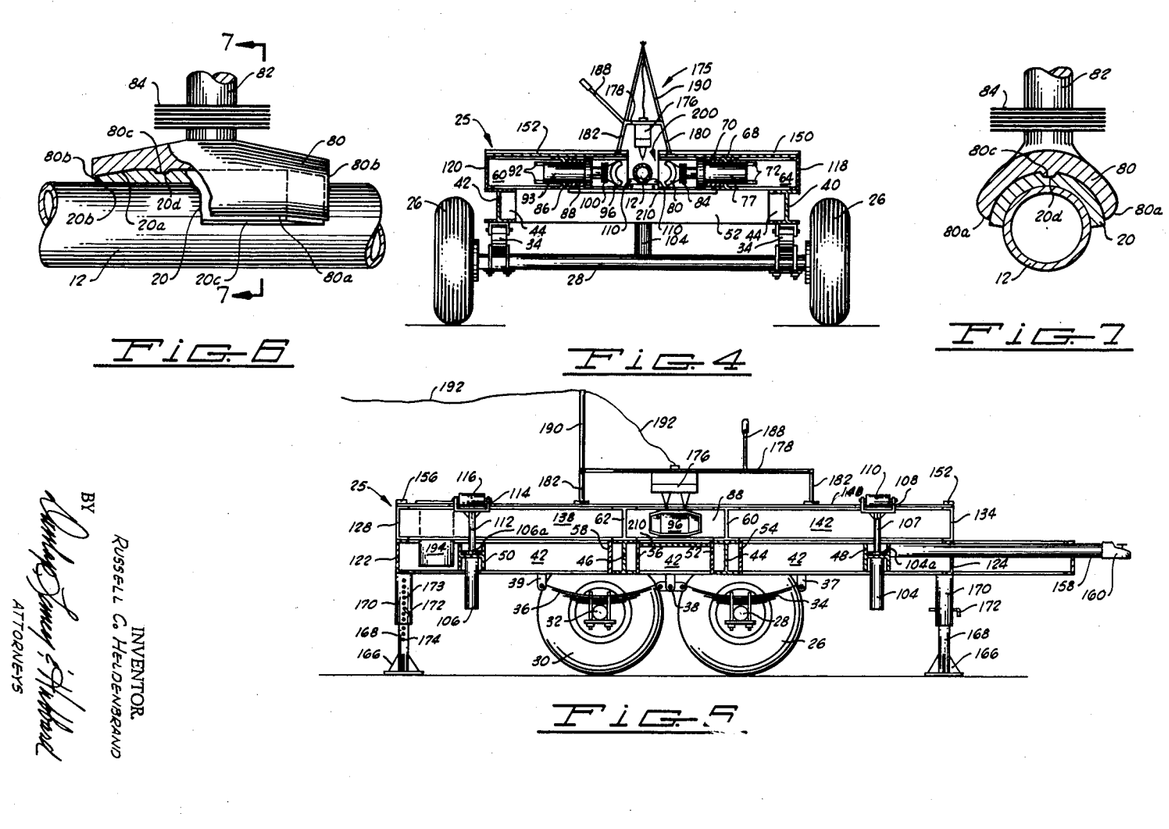
FIG. 4 is a sectional view substantially on lines 4—4 of FIG. 3.
FIG. 5 is a sectional view taken substantially on lines 5—5 of FIG. 3.
FIG. 6 is a side view, partially broken away, of a die used in the apparatus of FIG. 3 and which may be used in each embodiment of the invention described in this specification.
FIG. 7 is a sectional view taken substantially on lines 7—7 of FIG. 6.

Referring now to FIGS. 3, 4 and 5, a trailer mounted apparatus constructed in accordance with the present invention is indicated generally by the reference numeral 25. A set of wheels 26 is interconnected by an axle 28, and a set of wheels 30 is interconnected by an axle 32. The axles 28 and 32 are supported by pairs of springs 34 and 36, respectively (see FIG. 5), in the conventional manner by shackles 37, 38 and 39 which are attached to the chassis of the trailer presently to be described.

The chassis of a trailer constructed in accordance with the present invention, is comprised of two longitudinally extending I-beams 40 and 42 (see FIG. 4) which are interconnected by transversely extending I-beams 44 and 46 (see FIG. 5) and transversely extending H-beams 48 and 50. The I-beam 44 may be reinforced by plates 52 and 54 which are welded to the edges of the flanges of the I-beam 44. Similarly, I-beam 46 may be reinforced by plates 56 and 58 welded to the opposite edges of the flanges of the I-beams 46.

I-beams 60 and 62 are welded on top of one end of the I-beams 44 and 46, respectively, and similar I-beams 64 and 66 are welded on top of the other ends of the I-beams 44 and 46. The adjacent ends of the beams 60 and 64 are spaced apart (see FIG. 4), as are the adjacent ends of the beams 62 and 66 (see FIG. 3), to provide gaps for receiving the center portion 12 between the beams as shown in FIG. 4. An I-beam 68 extends between and is welded at the opposite ends thereof to the I-beams 64 and 66. A thick reinforcing plate 70 (see FIG. 4) may be attached to one side of the web of the beam 68, and the gussets 72 and 74 (see FIG. 3) may be welded between the web of the beam 68 and the webs of the beams 64 and 66, respectively, for reinforcement purposes. The cylinder 76 of a hydraulic motor 77 is provided with a flange 78. The cylinder 76 is received in bores in the reinforcing plate 70 and the web of the beam 68 with the flange 78 abutting the reinforcing plate 70. A die 80, hereafter described in greater detail, is connected to the end of the piston rod 82 of the hydraulic motor 77, and an electromagnetic coil 84 is wound around the rod 82. When energized, the electromagnetic coil 84 will hold a sleeve half 20 in the die 80 before it is pressed against the center portion 12.

An I-beam 86, a reinforcing plate 88 and reinforcing gussets 90 and 92 correspond to the I-beam 68, the reinforcing plate 70 and the gussets 72 and 74 previously described. A second hydraulic motor, indicated generally by the reference numeral 93, has a flanged cylinder 94 which is secured in the reinforcing plate 88 in the same manner as the hydraulic motor 77 is secured in the plate 70. A second die 96 is attached to the end of the hydraulic motor rod 98, and an electromagnetic coil is wound around the rod 98 and when energized will hold a sleeve half in the die 96.

The dies 80 and 96 are of identical construction, and for convenience of discussion and illustration only the die 80 will be described in detail. Referring now to FIG. 6, the die 80 is shown clamping a sleeve half 20 against the tubular center section 12 of a joint of drill pipe. It will be noted that the sleeve half 20 has a tapered shoulder at 20a and the very end of the sleeve has a thickness of approximately three-eighths of an inch at 20b. The well of the die 80 is concave and has a configuration precisely complementary to the external surface of the sleeve half 20. Further, it will be noted that the die 80 is substantially coextensive with the area of the sleeve half 20, except that the edges 80a are spaced sufficiently far from the edge 20c of the sleeve half 20 and somewhat beveled to readily permit the edge 20c to be welded to the similar edge of another sleeve half 20 positioned on the opposite side of the center portion 12. However, the ends 80b of the die 80 preferably extend over the ends 20b of the sleeve half 20 to form a semicircular shoulder for assuring that the sleeve half 20 is longitudinally aligned within the die 80. Some type of keying means, such as a small tapered projection 80c, may extend into a complementary recess 20d formed in the sleeve half 20 to assure circumferential alignment of the sleeve half 20 in the well of the die 80.

Fluid motors 104 and 106 are supported by flanges 104a and 106a which rest on the transverse H-beams 48 and 50, respectively, as can best be seen in FIG. 5. The fluid motors 104 and 106 may be hydraulically or pneumatically operated, as desired. The rod 107 of the fluid motor 104 extends vertically upwardly and supports a yoke 108 on which dual rollers 110 are journaled. Similarly, the rod 112 of the fluid motor 106 extends vertically upwardly and supports a yoke 114 upon which dual rollers 116 are journaled.

A pair of longitudinally extending channels 118 and 120 are welded on top of the longitudinally extending I-beams 40 and 42, respectively, as can best be seen in FIGS. 3 and 4. Lower transverse end channel beams 122 and 124 (see FIG. 5) interconnect the ends of the longitudinally extending I-beams 40 and 42. Upper rear channel beams 126 (see dotted line in FIG. 3) and 128 are welded on top of the rear lower transverse channel beam 122. The adjacent ends of upper end channel beams 126 and 128 are spaced apart to receive a joint of pipe as hereafter described. The outer ends of the channel beams 126 and 128 are welded to the longitudinal channel beams 118 and 120, respectively. Front upper channel beams 132 and 134 (see dotted line in FIG. 3) correspond to the channel beams 126 and 128 and are welded on top of the lower front transverse channel beam 124. The adjacent ends of the front channel beams 132 and 134 are spaced apart to receive the center portion 12 of a joint of pipe, and the outer ends thereof are welded to the longitudinally extending channel beams 118 and 120, respectively.

A channel beam structure 136 (see dotted outline in FIG. 3) interconnects the end of the I-beam 66 and the end of the channel beam 126, and a similar channel beam structure 138 interconnects the end of the I-beam 62 and the end of the channel 128. Similarly, a channel beam structure 140 interconnects the inner end of the channel beam 132 and the inner end of the I-beam 64, and a channel beam structure 142 interconnects the end of the channel beam 134 and the end of the I-beam 60. A deck plate 144 covers the area bounded by the longitudinal channel beam 118, the rear end channel beam 126, the channel beam assemblies 136 and 140, and the front end channel beam 132 and is supported by the channel beams and the I-beams 64 and 66. Similarly, a deck plate 146 is supported on the upper edges of and covers the area bounded by the longitudinal side channel beam 120, the rear end channel beam 128, the channel beam assemblies 138 and 142, and the front end channel beam 134. The deck plate 146 is provided with a large aperture 148 which forms a well in which an operator of the welding apparatus may stand as hereafter described in greater detail.

A pair of front runners 150 and 152 may be formed from rods welded on the deck plates 144 and 146, respectively. The adjacent ends of the runners 150 and 152 are spaced apart, as can best be seen in FIG. 4, to permit the center portion 12 of a joint of pipe to be lowered downwardly therebetween. Identical runners 154 and 156 are provided at the rear of the vehicle chassis, as best seen in FIG. 3. The adjacent ends of the runners 154 and 156 are also spaced apart a sufficient distance to permit the center portion 12 of a joint of pipe to pass downwardly therebetween.

A tongue 158 having a suitable trailer hitch 160 may be connected to the chassis substantially as shown in FIG. 5 and braced by diagonal channel beams 162 and 164. Four support feet 166, only two of which are shown in FIG. 5, may be placed at the four corners of the chassis to steady the apparatus during operation thereof. Each of the feet is connected to the end of a tubular member 168 which is received in another tubular member 170, which in turn is welded to the chassis of the trailer. A pin 172 may be inserted through any one of a series of apertures 173 in the tubular member 170 and then through apertures 174 in the tubular member 168 to adjustably position the respective foot 166 in engagement with the ground.

A welding assembly 175 comprises an automatic welding head 176 which is supported by a suitable rectangular frame 178 having two pairs of legs 180 and 182. The pairs of legs 180 and 182 are received in pairs of wells 184 and 186, respectively (see FIG. 3), formed in the deck plates 144 and 146 respectively. It will be noted that the pairs of wells 184 and 186 are on opposite sides of the center portion 12 of a joint of pipe. An elongated lever 188 is connected to the frame 178 and extends over the operator's well 148. An A-frame 190 extends upwardly from the rear end of the frame 178 for supporting the electrical cables 192 for the automatic weld head 176 above a joint of pipe which may be rolled across the trailer as hereafter described.

Four well-type furnaces 194 are received in apertures in the deck plates 144 and 146 as will be evident from a view of FIGS. 3 and 5. The well-type furnaces may have a peripheral flange at the upper end thereof resting on the respective deck plate 144 or 146. The well furnaces 194 may be of any conventional type and are of such a size as to receive a pair of the semicircular sleeve halves 20. The furnaces may be fired by a suitable fuel which is readily portable such as butane, for example.

At this point, it is well to note that what may be termed a slot 200 extends the entire longitudinal length of the trailer chassis for receiving the center portion 12 of a joint of pipe therein. The slot 200 is formed by the spacing between the ends of channel beams 132 and 134, between the ends of the runners 150 and 152, between the ends of the I-beams 60 and 64, between the ends of the I-beams 62 and 66, between the ends of the channel beams 126 and 128 and between the ends of the runners 154 and 156. The longitudinally extending slot 200 is then bounded at the rear by the channel beam structures 136 and 138 and at the front by channel beam structures 140 and 142, and has a depth as best seen in FIG. 4. The fluid motors 104 and 106 have a sufficient travel as to raise the pairs of rollers 110 and 116, respectively, substantially to the height of the sets of runners 150-152 and 154-156, substantially as shown in FIG. 5. The fluid motors 104 and 106 can also lower the pairs of rollers 110 and 116 substantially to the position shown in FIG. 4 whereby a joint of drill pipe resting on the sets of rollers will be aligned between the dies 80 and 96.

Figure 8:
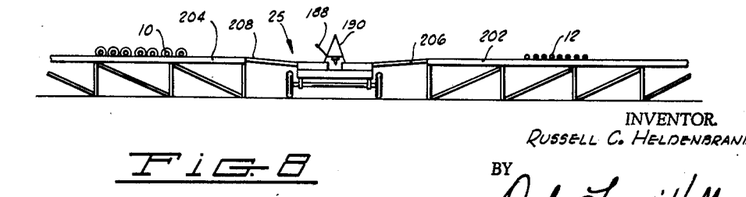
FIG. 8 is an end view of the apparatus of FIG. 3 disposed between two pipe racks such as would likely be found at the site of an oil well drilling operation.

When utilizing the apparatus 25 for applying a protective sleeve 18 to the center section 12 of a joint of drill pipe, the apparatus may be conveniently parked between two conventional pipe racks 202 and 204, as shown in FIG. 8. Skids 206 and 208 may be placed between the racks 202 and 204, respectively, and the deck of the apparatus 25 so that joints of drill pipe may be rolled down the skid 206 to the runners 150 and 154, and then after the protective sleeve has been applied to the drill pipe as will presently be described, the drill pipe may be rolled over the runners 152 and 156 and over the skids 208 onto the rack 204 where an insulated hood may be placed over the freshly applied protective sleeve to control the rate at which the protective sleeve cools. A pair of sleeve halves 20 is placed in each of the well furnaces 194 and heated to approximately 600° F.

A welder may stand on the ground within the aperture 148 in the deck 146. An assistant standing on the deck plates 144 or 146, may remove the heated sleeve halves from one of the well-type furnaces 194 and insert them in the dies 80 and 96. The circumferential end shoulders 80b, and the projections 80c and the mating recesses 20d assure that the sleeve halves will be properly positioned in the respective dies. The electromagnetic coils 84 and 100 should be energized to retain the preheated sleeve halves 20 in the respective dies 80 and 96. The fluid motors 104 and 106 are actuated to raise the rollers 110 and 116 to the level of the runners 150 and 154. A pipe is then rolled onto the rollers 110 and 116. The frame 178 may be tilted onto the legs 182 by pulling downwardly on the lever 188 to raise the legs 180 and the weld head 176 and permit the pipe to be rolled thereonto the rollers. The fluid motors 104 and 106 are then actuated to lower the center portion 12 of the pipe to the position shown in FIG. 4, which is in alignment between the dies 80 and 96.

The hydraulic motors 77 and 93 are then actuated to press the preheated sleeve halves, which are retained within the dies 80 and 96, against opposite sides of the center portion 12 on the drill pipe with sufficient force to slightly compress the drill pipe. The electromagnetic coils 84 and 100 may then be de-energized. The longitudinally extending weld groove formed by the adjacent edges of the sleeve halves 20 which are pressed around the center portion 12 of the joint of pipe is then filled with sufficient weld material to withstand the force of expansion of the center portion of the pipe when the pressure of the dies 80 and 96 is released. Then the fluid motors 77 and 93 are actuated to release the pressure of the dies 80 and 96. An assistant then rotates the center portion 12 of the pipe 180° until the other weld groove is facing upwardly and positioned under the weld head 176. The hydraulic motors 77 and 93 are again actuated to reclamp the sleeve halves 20 tightly around the center portion 12 of the pipe until the center portion 12 is slightly compressed as before. Once again the projections 80c and recesses 20d assist in properly aligning the sleeve halves 20 in the respective dies 80 and 96. The second weld seam 22 is then completed by filling the longitudinally extending weld groove formed between adjacent edges of the sleeve halves 20. The hydraulic motors 77 and 93 may then again be actuated to release the pressure of the dies 80 and 96 and then the pipe rotated once again 180° to position the first incomplete weld back under the welding head 176. The hydraulic motors 77 and 93 may again be actuated to press the dies 80 and 96 tightly against the sleeve halves 20 with sufficient pressure to again slightly compress the center portion 12 of the pipe and the weld seam first started completed. When both welded seams 22 are completed, the hydraulic motors 77 and 93 are actuated to release the sleeve 18 and the fluid motors 104 and 106 are actuated to raise the pipe back to the level of the runners 152 and 156. The pipe may then be rolled from the rollers 110 and 116 onto the runners 152 and 156 and up the skids 208 onto the rack 204. A suitable heat insulating jacket (not shown) may then be placed around the freshly applied protective sleeve 18 to prevent the formation of any undesirable internal stresses in the sleeve or pipe due to rapid or uneven cooling.

It will be appreciated that welding of the seams 22 of the protective sleeve 18 by a deposition of weld material in the weld groove formed by the adjacent edges of the sleeve half 20 will contribute substantial heat to the sleeve halves to maintain them at the desired high temperature during the welding operation. If the dies 80 and 96 are protected from wind by a bottom plate 210 welded between the plates 52 and 56 and the I-beams 68 and 86, for example, the sleeve halves 20 will not cool appreciably during the welding operation. In this case, it may be permissible to complete the first weld seam 22 so that the pipe need be rotated 180° only one time in order to complete both weld seams 22 before the pipe can be raised from the longitudinally extending slot 200.

It will be noted that a suitable conventional hydraulic supply (not illustrated) may be provided to operate the hydraulic motors 77 and 93. The fluid motors 104 and 106 may also be operated by the hydraulic fluid or by a separate supply of compressed air. Of course, a source of D.C. electrical power (not illustrated) is necessary to operate the welding head 176, and this source of electrical power may also be utilized to energize the electromagnetic coils 84 and 100. In this regard, it will be noted that the electromagnetic coils 84 and 100 will never be energized during the time when electric power will be required to operate the welding head 176.

Figure 9:
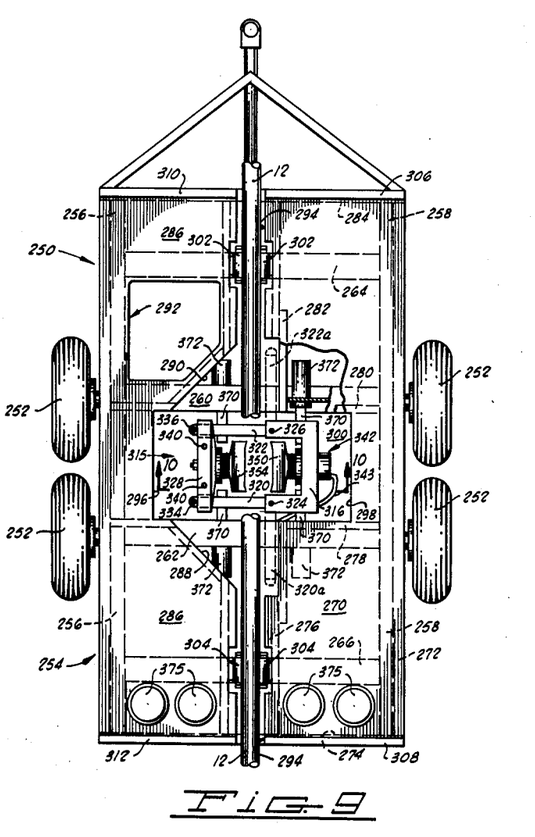
FIG. 9 is a plan view, partially broken away, of another embodiment of an apparatus constructed in accordance with the present invention, also mounted on a trailer for use in the field.
Figure 10:
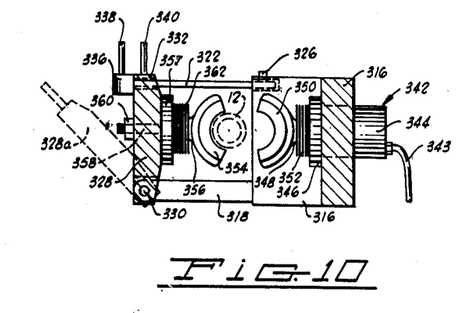
FIG. 10 is a sectional view taken substantially on lines 10—10 of FIG. 9.

The embodiment indicated generally by the reference numeral 250 and illustrated in FIGS. 9 and 10, has a chassis 254 which is mounted on four wheels 252 in any suitable manner. The trailer chassis 254 has two lower, longitudinally extending I-beams 256 and 258, shown in dotted outline, which are interconnected by two transverse I-beams 260 and 262, and front and rear H-beams 264 and 266, similar to the I-beams 44 and 46 and H-beams 48 and 50 as shown in FIG. 5. A deck plate 270 extends substantially the length of the trailer chassis 254 and is supported by an interconnected outline of channel beams (all shown in dotted line) which includes: a longitudinally extending channel beam 272, which rests on the I-beam 258; rear end channel beam 274 which, if necessary, may rest on a lower channel beam (not shown) interconnecting the ends of the I-beams 256 and 258; a channel beam assembly 276, which rests on the H-beam 266 and I-beam 262; channel beam 278, which rests on the I-beam 262; channel beam 280, which rests on the I-beam 260; channel beam assembly 282, which is supported by the I-beam 260 and the H-beam 264; and channel beam 284, which may rest on a lower channel (not shown) interconnecting the end of the I-beams 256 and 258.

A second deck plate 286 is supported by an interconnected outline of channel beams (also shown in dotted line) in substantially the same manner as the deck plate 270. Accordingly, the outline of supporting channel beams will not be described in detail. However, it will be noted that the corners of the deck plate 286 are tapered at 288 and 290 to permit operation of the device 315 for pressing the sleeve halves against the center portion 12 of the pipe as will be described. Also, the deck plate 286 is provided with a large aperture 292 in which a welder may stand while operating the apparatus. It will be noted that a longitudinally extending slot, indicated generally by the reference numeral 294, is formed between the deck plates 286 and 270 and the supporting channel beam structure described above. The longitudinally extending slot 294 corresponds substantially to the slot 200 of the device as best seen in FIG. 4. It will also be noted that the deck plate 286 is cut back a substantial distance at 296, and the deck plate 270 is correspondingly cut back a similar distance at 298 to provide an enlarged well 300 the use of which will be hereafter described.

A front pair of support rollers 302 are raised and lowered by a fluid motor (not shown) in substantially the same manner as the rollers 110 of the apparatus 25, as best seen in FIG. 5, were raised and lowered by the fluid motor 104. Similarly, a rear pair of support rollers 304 are raised and lowered by a fluid motor (not shown) in substantially the same manner as the rear rollers 116 of the apparatus 25 are raised and lowered by the fluid motor 106.

A first pair of runners 306 and 308 are disposed on the deck plate 270 and extend from the edge of the chassis 254 to the edge of the longitudinally extending slot 294 and correspond to the runners 150 and 154 of the apparatus 25. A similar pair of runners 310 and 312 are located at the ends of the deck plate 286 and extend from the slot 294 to the other edge of the chassis 254.

A clamping device, indicated generally by the reference numeral 315, is disposed in the well 300. The clamping device 315 is comprised of an extremely rigid C-shaped member 316 having two rigidly connected arms 318, only one of which is shown in FIG. 10, but which are located directly below pivoted arms 320 and 322, as seen in FIG. 9. The arms 320 and 322 are pivotally connected to the C-shaped member 316 by pins 324 and 326, respectively. A plate 328 is pivotally connected at the lower edge thereof to the ends of the rigid arms 318 by pins 330, as best seen in FIG. 10. The pivoted arms 320 and 322 are received in slots which are indicated in dotted outline at 332 (see FIG. 10) in the top of the side edges of the plate 328. The ends of the pivoted arms 320 are provided with enlarged lugs 334 and 336 which will not pass through the slots 332. Each of the lugs 334 and 336 may be provided with vertically extending handle 338, as is indicated by reference numeral only in FIG. 10. Similarly, the upper edge of the pivoted plate 328 may be provided with a pair of upstanding handles 340 for conveniently operating the device 315 as hereafter described.

A hydraulic motor, indicated generally by the reference numeral 342, has a cylinder 344 which is received in a bore in the center of C-shaped member 316. A flexible hose 343 is connected to supplying hydraulic power fluid to the cylinder 344. The cylinder 344 is provided with a flange 346 for transferring force exerted on the cylinder to the C-shaped member 316. The rod 348 of the hydraulic motor 342 is connected to a die 350 which may be identical in construction to the previously described die 80. An electromagnetic coil 352 is preferably wound around the rod 348 or otherwise affixed in operative position with relation to the die 350 so as to retain a sleeve half positioned in the die 350. An identical die 354 is connected to a rod 356, which in turn is connected to a flange 357 which abuts against the pivoted plate 328. A bolt 358 is connected to the flange 357 and passes through the pivoted plate 328. A nut 360 is threaded onto the bolt 358 and secures the die 354 in proper alignment. Another electromagnetic coil 362 is preferably wound around the rod 356 for creating a magnetic field to retain a sleeve half in the die 354 when energized.

The entire clamping device 315 is preferably so constructed as to be substantially balanced when clamped upon the center portion 12 of a joint of pipe as hereafter described in detail. When the device 315 is not clamped onto a pipe, it is supported in the well 300 by four rods 370 of four fluid motors 372. The cylinders of the front pair of fluid motors 372 are mounted in the web of the transverse I-beam 260. Similarly, the cylinders of the rear set of fluid motors 372 are mounted in the web of the transverse I-beam 262. The ends of the rods 370 may be tapered to form wedges which may be forced under the clamping device 315 even though the device 315 may be slightly too low as a result of sag in the pipe which may be called upon to support the device 315 as hereafter described. The fluid motors 372 also operate to withdraw the rods 370 from beneath the device 315.

The welding assembly similar to the assembly 175 illustrated in FIGS. 4 and 5 and forming a part of the apparatus 25, may be used in the identical manner with the apparatus 250 although no wells are illustrated in FIG. 9 for receiving the legs 180 and 182. Four well furnaces 375 may be supported by the deck plates 270 and 286 in the same manner as the well furnaces 194 were supported by the deck plates 144 and 146 in the apparatus 25.

Operation of the apparatus 250 is similar to the operation of the apparatus 25 until such time as it is desired to lower a joint of pipe into the longitudinally extending slot 294. The arms 320 and 322 are disconnected from the pivoted plate 328 and pivoted to positions 320a and 322a, respectively, as shown in dotted outline in FIG. 9, which are parallel to the longitudinally extending slot 294. The pivoted plate 328 will pivot outwardly and downwardly to assume the position 328a as shown in dotted outline in FIG. 10. With the pivoted arms 320 and 322 and the pivoted plate 328 in these positions the heated sleeve halves 20 may be easily inserted in the dies 350 and 354. The center portion 12 of a drill pipe is then rolled onto the support rollers 302 and 304 and lowered into alignment with the die 350, substantially as shown by dotted outline in FIG. 10.

After the pipe has been lowered into alignment with the die 350, the pivoted plate 328 is raised conveniently by the handle 340 to the vertical position, and the pivoted arms 320 and 322 moved into the respective slots 332 with the lugs 336 behind the plate 328 as shown in solid line in FIGS. 9 and 10. Next, the hydraulic motor 342 is actuated to move the die 350 toward the other die 354 and thereby press the sleeve halves 20 securely against the pipe, preferably with sufficient force as to slightly compress the pipe. The fluid motors 372 are then actuated so as to withdraw the rods 370 from beneath the clamping device 315. Since the clamping device 315 is securely clamped around the sleeve halves 20 and around the center portion 12 of the joint of pipe which is resting on the support rollers 302 and 304, the support rollers 302 and 304 will support both the pipe and the clamping device 315.

The weld groove formed by the adjacent edges of the sleeve halves 20 which is facing upwardly can now be welded either partially or completely by an automatic welding apparatus disposed above the sleeve halves. Then, without releasing the pressure exerted by the hydraulic motor 342, the entire clamping device 315, together with the center portion 12 of the joint of pipe, can be rotated 180° on the support rollers 302 and 304 until the lower weld groove is positioned on top for welding. The flexible hydraulic hose 343 may be connected to the chassis 254 directly below the center portion 12 of the joint of pipe to readily permit the entire clamping device 315 to be rotated through 180°, preferably with the fluid motor 342 passing under the center portion 12 of the joint of pipe. When the second weld is completed, as desired, the clamping device 315 is rotated back through 180° to the position shown in FIG. 9. The fluid motors 372 are then actuated and the wedge-shaped rods 370 wedged under the clamping device 315, raising it if necessary, until the apparatus is supported by the rods 370 in the previously aligned position. The pressure exerted by the hydraulic motor 342 may then be released so that the die 350 moves away from the freshly applied integral sleeve 18 on the center portion 12 of the joint of drill pipe. The pressure on the lugs 334 and 336 will then be released and the arms 320 and 322 may be pivoted back into positions 320a and 322a, respectively, and the pivoted plate 328 pivoted downwardly to position 328a. The center portion 12 of the joint of drill pipe can then be raised by the rollers 302 and 304 and rolled over the runners 310 and 312 and onto the rack disposed at the left-hand side of the apparatus 250, for example, as the operator standing in the well 292 first lifts the welding head support frame 178 to permit the center portion 12 of the joint of drill pipe to pass under the legs 182, and then ducks into the well to permit the pipe to pass over his head. The clamping device 315 will then be in position to receive the next pipe and the operating procedure can be repeated.

Figure 11:
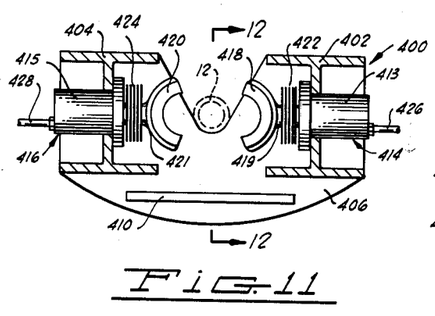
FIG. 11 is a sectional view of an apparatus which may be used in place of the apparatus shown in FIG. 10 and is taken substantially on lines 11—11 of FIG. 12.
Figure 12:
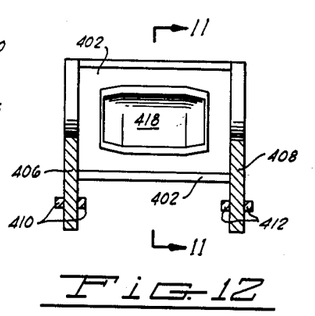
FIG. 12 is a sectional view taken substantially on lines 12—12 of FIG. 11.

Referring now to FIGS. 11 and 12, a clamping device, indicated generally by the reference numeral 400, may be substituted for the clamping device 315 and used in combination with the apparatus 250. The clamping device 400 has a generally rectangular frame comprised of two parallel I-beams 402 and 404 interconnected at the ends thereof by plates 406 and 408. The plates 406 and 408 are slightly U-shaped, as can best be seen in FIG. 11, in order to position the I-beams 402 and 404 on opposite sides of the center portion 12 of a joint of drill pipe. The center sections of the plates 406 and 408 may be stiffened by ribs 410 and 412. The cylinders 413 and 415 of hydraulic motors 414 and 416 are mounted on the webs of the I-beams 402 and 404, respectively. Dies 418 and 420 are connected to the rods 419 and 421 of the hydraulic motors 414 and 416, respectively, and are of substantially identical construction to the die 80 previously described. Electromagnetic coils 422 and 424 are wound around the rods 419 and 421, respectively, for holding a sleeve half 20 in each die as previously described. High pressure hydraulic fluid is supplied to the hydraulic motors 414 and 416 by flexible hose 426 and 428, respectively.

The operation of the clamping device 400 is substantially identical to that of the clamping device 315. The clamping device 400 is positioned in the well 300 of the apparatus 250 and is supported by the rods 370 with the open sides of the U-shaped plates 406 and 408 facing upwardly, substantially as shown in FIG. 11. The center portion 12 of a drill pipe can then be lowered by the support rollers 302 and 304 until it is aligned directly between the dies 418 and 420. The hydraulic motor 414 and 416 can then be actuated to press preheated sleeve halves 20 which may be disposed in the dies 418 and 420 firmly against the drill pipe. When the fluid motors 372 are actuated to withdraw the rods 370, and the clamping device 400 can be rotated with the center portion 12 of the pipe as desired in order to weld the adjacent edges of the sleeve halves 20 as previously described in connection with the clamping device 315.

Figure 13:
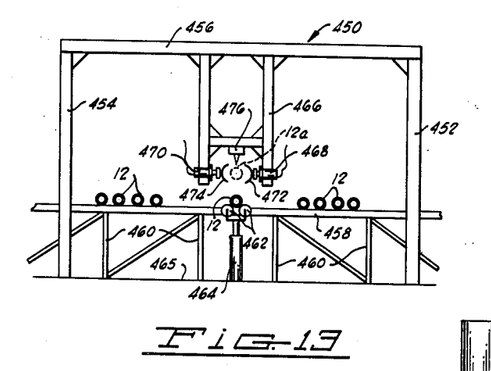
FIG. 13 is a schematic end view of an apparatus constructed in accordance with the present invention, and especially adapted for installation in a plant.

An embodiment of the present invention particularly adapted for use in a plant or fixed-site operation is shown somewhat schematically in FIG. 13, and is indicated generally by the reference numeral 450. The apparatus 450 is shown located within a building structure having wall columns 452 and 454 and ceiling beams 456 of sufficient strength to support an additional load as hereafter described. A conventional pipe rack 458 may be comprised of two parallel runners only one of which is illustrated. The runners may be supported by a plurality of legs 460. A number of joints of drill pipe may then be located on the pipe rack 458 for horizontal movement thereacross. Two pairs of lift rollers 462, only one pair of which is shown, are each raised and lowered by a fluid motor 464 which may rest on the floor 465. The two pairs of lift rollers are spaced apart to lift a joint of drill pipe as hereinafter described. A depending support structure 466 is suspended from the overhead ceiling beams 456 and comprises any suitable structure of sufficient strength for supporting a pair of hydraulic motors 468 and 470 in opposed relationship substantially as indicated. A pair of dies 472 and 474, substantially identical in construction to the die 80 previously described, are connected to the rods of the hydraulic motors 468 and 470. Actuation of the hydraulic motors 468 and 470 moves the dies 472 and 474 one toward the other with sufficient force as to slightly compress a joint of pipe positioned therebetween, it being understood that the support structure 466 is of sufficient strength to transmit this force. Of couse, the dies 472 and 474 are adapted to receive semicircular sleeve halves 20 as previously described and may be provided with electromagnetic coils (not shown) for retaining the sleeve halves 20 as previously described. An automatic welding head 476 is also supported by the structure 466 in operative position above the level of the dies 472 and 474 and in vertical alignment with the lift rollers 462.

The operation of the apparatus 450 of FIG. 13 is similar to the operation of the apparatuses 25 and 250 previously described. After preheated sleeve halves have been placed in the dies 472 and 474, the center portion 12 of a joint of drill pipe is positioned over the two pairs of lift rollers 462 and the fluid motors 464 are actuated to raise the lift rollers 462 and the joint of pipe to a level directly aligned between the dies 472 and 474 as represented by the dotted outline 12a. The hydraulic motors 468 and 470 are then actuated to move the dies 472 and 474 one toward the other and press the sleeve halves held therein against the center portion 12 with sufficient force to slightly compress the pipe. The adjacent edges of the sleeve halves 20 will then form one weld groove directly below the welding head 476 and another under the pipe. The welding head 476 is then operated in the conventional manner to either partially complete or finally complete the first welded seam 22 joining the sleeve halves 20 together at the top. Then the hydraulic motors 468 and 470 are actuated to release the pressure of the dies 472 and 474. The pipe, together with the sleeve halves 20, may then be rotated 180° on the lift rollers 462 until the other weld groove formed by the other adjacent edges of the sleeve halves is positioned directly below the automatic weld head 476. Then the hydraulic motors 468 and 470 are again actuated to press the sleeve halves 20 tightly against the center portion 12 of the joint of drill pipe with the same force as previously described. The second weld groove may then be accomplished to complete the process of welding the two sleeve halves together to form an integral protective sleeve 18. The hydraulic motors 468 and 470 may then be actuated to release the pressure of the dies 472 and 474 and the pipe lowered by the fluid motors 462 back onto the pipe rack 458. The pipe can then be rolled to the left-hand end of the pipe rack 458 where an insulated jacket may be placed thereon to control the rate and uniformity of cooling, and the procedure repeated on the next joint of pipe.

Figure 14:
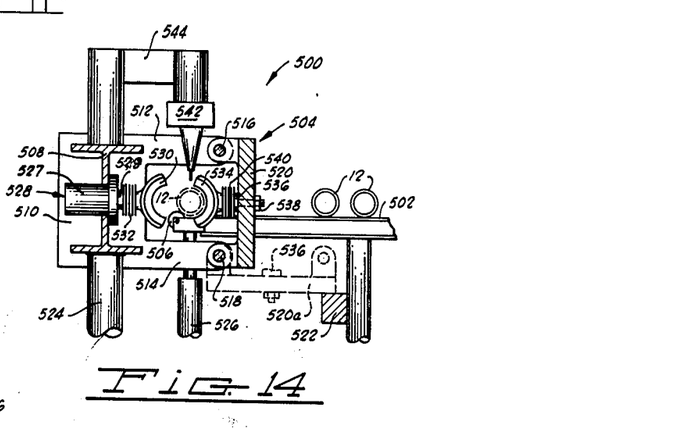
FIG. 14 is a sectional view of another manipulating apparatus constructed in accordance with the present invention and is suitable for use either on a trailer or in a fixed-base plant.

Still another embodiment of the present invention is indicated generally by the reference numeral 500 and is illustrated in FIG. 14. The apparatus 500 is comprised of a pipe rack 502 which may be of the conventional construction such as two horizontally disposed rails positioned on each side of the clamping device, indicated generally by the reference numeral 504, which is presently to be described. At least two pairs of support rollers 506 (only one pair being shown) are disposed substantially at the same elevation as the rack 502 and at the end thereof so that a pipe rolled across the rack 502 will come to rest on the two pairs of support rollers 506. The two pairs of support rollers 506 may conveniently be disposed on opposite sides of the clamping device 504.

The clamping device 504 is comprised generally of a horizontally disposed I-beam 508 which interconnects two C-shaped plates 510, only one of which is shown in FIG. 14. The C-shaped plates 510 may be welded to the ends of the I-beam 508. The C-shaped plates 510 are so disposed as to encircle the center portion 12 of a joint of drill pipe which may be resting on the support rollers 506, substantially as shown in FIG. 14. The outer ends of the arms 512 and 514 of the C-shaped plates 510 are provided with apertures for receiving a removable pin 516 and a hinge pin 518, respectively.

A pivoted plate 520 extends between the two arms 512 and 514 and is provided with ears having bores therein for receiving the removable pin 516 and the hinge pin 518. When the pin 516 is removed, the plate 520 is pivotable outwardly and downwardly in a clockwise direction, when referring to FIG. 14, about the pivot pin 518 to assume the position 520a indicated in dotted outline. A suitable stop 522 may be provided to arrest the downward travel of the pivoted plate 520 in the position 520a. Suitable legs 524 and 526 may be provided to support the clamping device 504 either on the ground of a building, or on a mobile vehicle as desired.

The cylinder 527 of a hydraulic motor 528 is connected to the web of the beam 508. The rod 529 of the hydraulic motor 528 is connected to a die 530 which may be identical to the die 80 previously described. An electromagnetic coil 532 may also be wound around the rod 529 for retaining a sleeve half in the die 530 as previously described. A second die 534, which is also identical to the die 80 previously described, is connected by a rod 536 to the pivoted plate 520, and may be held in place thereon by a small threaded bolt, which passes through the plate 520 and a nut 538. An electromagnetic coil 540 is also preferably wound around the rod 536 for retaining a sleeve half 20 in the die 534 by electromagnetic force as previously described.

An automatic welding head 542 is supported by a cantilever structure 544 which may be attached to the I-beam 508. The welding head 542 is disposed above the center portion 12 of a joint of drill pipe which may be resting on the support rollers 506.

When operating the apparatus 500 to apply a protective sleeve 18 to the center portion 12 of a joint of drill pipe, the pin 516 is first removed and the pivoted plate 520 pivoted downwardly into the position 520a where the plate 520 will rest on the stop 522. Preheated sleeve halves are placed in the dies 530 and 534 and are retained therein by the electromagnetic force produced by the electromagnetic coils 532 and 540, respectively. A joint of pipe on the rack 502 is then rolled over the lowered plate 520 and die 534 onto the support rollers 506. The pivoted plate 520 is then pivoted upwardly into the position shown in solid line in FIG. 14. The pin 516 is inserted through the bores in the ears of the pivoted plate 520 and in the arms 512. When the pivoted plate 520 is in the raised position, the sleeve half 20 retained in the die 534 should abut lightly against the center portion 12 of the joint of drill pipe. The hydraulic motor 528 is then actuated to move the die 530 toward the die 534 and press the sleeve halves in the dies against the pipe with sufficient force to slightly compress the center portion 12 of the joint of drill pipe.

The abutting edges of the sleeve halves 20 will then be disposed directly under the weld head 542 and the first welded seam may be either partially or totally completed, as is required or desired. The hydraulic motor 528 is then actuated to release the pressure applied by the die 530, and the pipe is rotated 180° on the support rollers 506 to position the other weld groove formed by edges of the sleeve halves 20 under the weld head 542. The hydraulic motor 528 is again actuated to move the dies 530 and 534 together and clamp the two sleeve halves 20, which are now welded only along one seam, against the pipe until the center portion 12 is again slightly compressed. The second welded seam may then be accomplished. The hydraulic motor 528 can then be actuated to release the pressure of the die 530, the pin 516 removed, and the pivoted plate 520 is pivoted downwardly to the position 520a. The center portion 12 of the joint of drill pipe, with the freshly applied integral sleeve 18 welded therearound, may then be rolled from the support rollers 506 onto the pipe rack 502 for disposition as is convenient for controlling the cooling of the sleeve.

Figure 15:
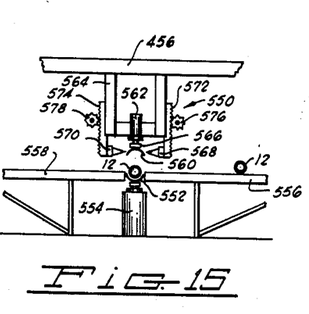
FIG. 15 is a side view of still another apparatus constructed in accordance with the present invention.

Referring now to FIG. 15, still another embodiment of the present invention is indicated generally by the reference numeral 550. The manipulating apparatus 550 may be utilized in a building or similar structure wherein an overhead support beam such as the beam 456 in FIG. 13 is available. A first upwardly facing die 552 is supported by any convenient support structure 554. The support structure 554 may or may not include a hydraulic motor (not shown) for moving the die 552 upwardly. A first set of runners 556 are disposed at substantially the same height as the top edge of the die 552 and extend in one direction therefrom. Although not shown, there are preferably two runners 556 spaced apart on opposite sides of the support structure 554 to form a conventional dual rail pipe rack. Similarly spaced runners 558 are disposed at substantially the same height as the die 552, and extend in the opposite direction from the runners 556. A second downwardly facing die 560 is actuated by a hydraulic motor 562 which may be supported by any suitable depending structure 564. The depending structure 564 may in turn be supported by the overhead beam 456. It may be desirable to include a large mass (not shown) on the support structure 564 to assist in counteracting the upward thrust produced by the hydraulic motor 562 when actuated as hereafter described. The rod of the hydraulic motor 562 is connected to the die 560 and is of such a length as to be capable of raising the die 560 sufficiently high to permit a pipe to be rolled from the rails 556 onto a sleeve half nestled in the lower die 552, and then to lower the die 560 until a sleeve half retained therein is pressed tightly against the center portion 12 of the joint of drill pipe resting on the lower die. In this regard, an electromagnetic coil 566 may be provided for retaining the sleeve half in the downwardly facing die 560 by electromagnetic force as previously described.

A pair of weld heads 568 and 570 capable of applying a weld to a horizontally disposed weld groove on the side of a pipe are supported by vertically disposed rack gears 572 and 574, respectively. Suitable pinions 576 and 578, driven by any suitable means (not shown), mesh with the rack gears 572 and 574, respectively, to raise the weld heads 568 and 570 to permit the pipe to be rolled into the position shown. The weld heads 568 and 570 may then be lowered into position to weld the adjacent edges of two sleeve halves pressed against the pipe as hereafter described.

In operation, the hydraulic motor 562 is actuated to raise the upper die 560 into its uppermost position. The pinions 576 and 578 are also driven in such a manner as to raise the weld heads 568 ad 570 into their uppermost positions. Preheated sleeve halves, such as those heretofore described and indicated by the reference numeral 20 are then placed in the lower and upper dies 552 and 560, respectively. The center portion 12 of a joint of drill pipe may then be rolled from the runners 556 onto the sleeve half in the lower die 552. The hydraulic motor 562 is then actuated to lower the upper die 560 and press the two sleeve halves against the center portion 12 of the pipe with sufficient force as to slightly compress the pipe. The two pinions 576 and 578 may then be actuated to lower the weld heads 568 and 570, respectively, into position to weld the adjacent edges of the sleeve halves which will form horizontally extending weld grooves on each side of the pipe. The welded seams may be completed simultaneously without releasing the pressure applied by the hydraulic motor 562. When the seams are completed, the hydraulic motor 562 and the pinions 576 and 578 may then be actuated to raise the upper die 550 and the weld heads 568 and 570, respectively. The joint of pipe with the protective sleeve welded therearound may then be rolled from the lower die 552 onto the left-hand pipe rack rails 558.

From the above, it will be evident to those skilled in the art that several novel and highly useful devices have been described and illustrated for applying a protective sleeve to a joint of drill pipe. The embodiments of the present invention indicated generally by the reference numerals 25 and 250 may be transported to a well site and the cumbersome and heavy joints of drill pipe handled with maximum ease due to the novel arrangements of the various novel components. The embodiments of the present invention indicated generally by the reference numerals 450, 500 and 550 are particularly adapted for a fixed-base, or shop-type operation.

Having thus described several preferred embodiments of the invention, it is to be understood that various combinations, substitutions, and changes can be made therein without departing from the spirit and scope of the invention as defined by the appended claims.

I claim:

1. Manipulating apparatus for press fitting and welding two preheated, semicircular sleeve halves around a joint of drill pipe to form an integral protective sleeve, the manipulating apparatus comprising:

support means for supporting a joint of pipe;

a pair of dies each having a concave well for holding a sleeve half, the dies being disposed on opposite sides of a joint of pipe disposed on the support means;

means for moving the dies one toward the other for pressing sleeve halves disposed in the concave wells against opposite sides of the joint of pipe with the edges of the sleeve halves in adjacent relationship; and means for welding the adjacent edges of the sleeve halves together with a weld seam extending longitudinally of the joint of pipe.

2. Manipulating apparatus as defined in claim 1 wherein:

the support means comprises a plurality of support rollers for rotating the pipe about its longitudinal axis.

3. Manipulating apparatus as defined in claim 1 wherein:

the means for moving the dies one toward the other comprises at least one hydraulic motor.

4. Manipulating apparatus as defined in claim 1 wherein:

the means for moving the dies one toward the other comprises two hydraulic motors.

5. Manipulating apparatus as defined in claim 1 wherein:

the means for moving the dies one toward the other is rotatable with the pipe.

6. Manipulating apparatus as defined in claim 1 wherein the means for moving the dies one toward the other comprises:

a hydraulic motor for moving one of the dies, a pivoted member for positioning the other die adjacent the pipe and for moving the other die away from the pipe; and latching means for holding the pivoted member with the die positioned adjacent the pipe.

7. Manipulating apparatus as defined in claim 6 wherein:

the hydraulic motor and the pivoted member are interconnected by tension means, and the tension means, the hydraulic motor, the pivoted member and the dies are rotatable with the pipe.

8. Manipulating apparatus as defined in claim 2 further characterized by:

substantially horizontally disposed runners over which a pipe can be rolled, the runners extending in opposite directions from the support rollers, the runners being disposed higher than the pair of dies and the means for moving the dies one toward the other, whereby a pipe may be rolled over the dies and the means for moving the dies one toward the other.

9. Manipulating apparatus as defined in claim 8 further characterized by:

means for raising and lowering the support rollers between the height of the runners and the height of the dies.

10. Manipulating apparatus as defined in claim 6 further characterized by:

substantially horizontally disposed runners over which a pipe may be rolled extending from the support means away from the dies, the runners being at substantially the height of the support means, and the pivoted member is pivotable to a point below the runners for permitting a pipe rolled along the runners to pass thereover.

11. Manipulating apparatus as defined in claim 2 further characterized by:

substantially horizontally disposed runners over which a pipe can be rolled, the runners extending in opposite directions from the support rollers, the runners being disposed at a height lower than the height of the dies, and means for raising and lowering the support rollers between the height of the runners and the height of the dies.

12. Manipulating apparatus as defined in claim 1 further characterized by:

electromagnetic means positioned adjacent each of the dies for holding a sleeve half in the concave well thereof prior to pressing of the sleeve halves against a pipe.

13. Manipulating apparatus as defined in claim 2 wherein:

the means for welding the adjacent edges of the sleeve halves together comprises an automatic welding head, and further characterized by means for supporting the welding head in operative position above a joint of pipe resting on the support rollers.

14. Manipulating apparatus as defined in claim 8 wherein:

the means for welding the adjacent edges of the sleeve halves together comprises an automatic welding head, and further characterized by support means for supporting the welding head in operative position above a joint of pipe resting on the support rollers, the last mentioned support means comprising a frame spanning across the support rollers and having legs resting on either side thereof whereby the frame can be tilted alternately in each direction to permit a pipe to be rolled over the runners to the support rollers and from the support rollers over the runners extending in the other direction.

15. Manipulating apparatus as defined in claim 1 wherein:

the dies are vertically aligned;

the lower die is rigidly supported;

the upper die is raised and lowered by a hydraulic motor; and the apparatus is further characterized by runners extending in each direction from the lower die and disposed at substantially the same height.

16. Manipulating apparatus as defined in claim 15 further characterized by:

electromagnetic means for holding a sleeve half in the upper die until it is lowered onto the pipe.

References Cited by the Examiner

UNITED STATES PATENTS

| 1,801,140 | 4/31 | Chapman | 113—134 XR |
| 1,907,702 | 5/33 | Anderson | 113—130 XR |
| 2,034,451 | 3/36 | Tripp | 113—130 |
| 2,373,163 | 4/45 | Cailloux et al. | 113—102 |
| 2,453,369 | 11/48 | Grable et al. | 113—102 |
| 2,483,230 | 9/49 | Parsons et al. | 113—102 |
| 3,022,994 | 2/62 | Eklund | 269—8 |

FOREIGN PATENTS 1,266,415  5/61  France.

CHARLES W. LANHAM, *Primary Examiner.*

JOHN F. CAMPBELL, *Examiner.*